(12) United States Patent
Singh

(10) Patent No.: US 9,992,714 B1
(45) Date of Patent: Jun. 5, 2018

(54) DYNAMIC MANAGEMENT OF HANDOFF BASED ON DETECTED NETWORK

(71) Applicant: Sprint Spectrum L.P., Overland Park, KS (US)

(72) Inventor: Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1283 days.

(21) Appl. No.: 13/659,511

(22) Filed: Oct. 24, 2012

(51) Int. Cl.
*H04W 36/00* (2009.01)
*H04W 76/02* (2009.01)

(52) U.S. Cl.
CPC ... *H04W 36/0083* (2013.01); *H04W 36/0022* (2013.01); *H04W 76/028* (2013.01)

(58) Field of Classification Search
USPC .................. 370/310–350; 455/432.1–444
See application file for complete search history.

(56) References Cited

U.S. PATENT DOCUMENTS

| | | | |
|---|---|---|---|
| 5,873,033 A | 2/1999 | Hjern et al. | |
| 6,034,950 A | 3/2000 | Sauer et al. | |
| 6,101,175 A | 8/2000 | Schorman et al. | |
| 6,714,789 B1 | 3/2004 | Oh et al. | |
| 7,076,245 B1 | 7/2006 | Satapathy | |
| 7,437,176 B1 | 10/2008 | Ribas et al. | |
| 7,471,950 B1 | 12/2008 | Oh et al. | |
| 7,546,124 B1 | 6/2009 | Tenneti et al. | |
| 7,551,586 B1 | 6/2009 | Yew et al. | |
| 7,738,427 B1 | 6/2010 | Yew et al. | |
| 7,933,602 B1 | 4/2011 | Balakrishnan et al. | |
| 7,937,103 B1 | 5/2011 | Sigg et al. | |
| 7,945,281 B1 | 5/2011 | Sigg et al. | |
| 7,974,621 B2 | 7/2011 | Zhou et al. | |
| 8,010,117 B1 | 8/2011 | Sigg et al. | |
| 8,019,343 B2 | 9/2011 | Tenneti et al. | |
| 8,064,910 B2 | 11/2011 | Lee | |
| 8,417,244 B2 * | 4/2013 | Alonso-Rubio | H04W 36/0005 370/331 |
| 8,805,378 B2 * | 8/2014 | Choi | H04W 36/0072 370/331 |
| 2002/0067707 A1 | 6/2002 | Morales et al. | |
| 2002/0110101 A1 | 8/2002 | Gopalakrishnan et al. | |
| 2003/0152049 A1 | 8/2003 | Turner | |
| 2004/0120283 A1 | 6/2004 | Rezaiifar et al. | |
| 2005/0130660 A1 | 6/2005 | Park et al. | |

(Continued)

OTHER PUBLICATIONS

U.S. Appl. No. 11/942,933, filed Nov. 20, 2007. J. McNair et al., "Vertical Handoffs in Fourth-Generation Multinetwork Environments," IEEE Wireless Communications, pp. 8-15, Jun. 2004.

(Continued)

*Primary Examiner* — Rasheed Gidado

(57) ABSTRACT

A method and corresponding system to help improve handoff of a wireless communication device from a first network to a particular second network. The first network may maintain data that includes operational parameters of each of a plurality of second networks, such as networks that provide coverage in the same market area as the first wireless network. When the first network receives from a wireless communication device an indication that the device has detected coverage of a particular one of the second networks, the first network may then provide the device with the corresponding set of operational parameters for the detected second network.

20 Claims, 4 Drawing Sheets

(56) References Cited

U.S. PATENT DOCUMENTS

| | | |
|---|---|---|
| 2005/0202828 A1 | 9/2005 | Pecen et al. |
| 2005/0255849 A1 | 11/2005 | Kang et al. |
| 2006/0039329 A1 | 2/2006 | Samuel et al. |
| 2006/0104228 A1 | 5/2006 | Zhou et al. |
| 2006/0200543 A1 | 9/2006 | Kong et al. |
| 2006/0268756 A1 | 11/2006 | Wang et al. |
| 2006/0268783 A1 | 11/2006 | Julian et al. |
| 2007/0097924 A1* | 5/2007 | Martinovich ......... H04W 36/30 370/332 |
| 2007/0258436 A1 | 11/2007 | Kulkarni et al. |
| 2007/0275737 A1 | 11/2007 | Sakaniwa |
| 2008/0032628 A1 | 2/2008 | Vehvilainen et al. |
| 2008/0102843 A1 | 5/2008 | Todd et al. |
| 2008/0305799 A1 | 12/2008 | Zuniga et al. |
| 2012/0100858 A1* | 4/2012 | Qin ................... H04W 36/0038 455/437 |
| 2015/0063296 A1* | 3/2015 | Noma ............... H04W 36/0022 370/331 |

OTHER PUBLICATIONS

E. Boysen, et al., "Proactive Handover in Heterogeneous Networks using SIPs," IEEE Computer Society, Seventh International Conference on Networking, pp. 719-724, 2008.

F. Feng and D. Reeves, "Explicit Proactive Handoff with Motion Prediction for Mobile IP," IEEE Communications Society, pp. 855-860, 2004.

K. Kastell, et al., "Performance Advantage and Use of a Location Based Handover Algorithm," IEEE, pp. 5260-5264, 2004.

L. Lu and J. Wu, "Handoff Prediction by Mobility Characteristics in Wireless Broadband Networks," Proceedings of the Sixth IEEE International Symposium on a World of Wireless Mobiel and Multimedia Networks, 2005.

L. Lu, et al., "The Study of Handoff Prediction Schemes for Resource Reservation in Mobile Multimedia Wireless Networks," IEEE Computer Society, Proceedings of the 18th International Conference on Advanced Information Networking and Application, 2004.

* cited by examiner

DYNAMIC MANAGEMENT OF HANDOFF BASED ON DETECTED NETWORK

BACKGROUND

Unless otherwise indicated herein, the materials described in this section are not prior art to the claims and are not admitted to be prior art by inclusion in this section.

A typical cellular wireless system includes a number of base stations that radiate to define wireless coverage areas, such as cells and cell sectors, in which user equipment devices (UEs), such as cell phones, tablet computers, tracking devices, embedded wireless modules, and other wirelessly equipped communication devices, can operate. In turn, each base station is typically coupled with equipment that provides connectivity with one or more transport networks, such as the public switched telephone network (PSTN) and/or the Internet for instance. With this arrangement, a UE operating within a coverage area of any base station can engage in air interface communication with the base station and can thereby communicate via the base station with various remote network entities or with other UEs served by the base station.

In general, a cellular wireless system may operate in accordance with a particular air interface protocol or "radio access technology," with communications from the base stations to UEs defining a downlink (or forward link) and communications from the UEs to the base stations defining an uplink (or reverse link). Examples of existing air interface protocols include CDMA (e.g., 1xRTT and 1xEV-DO), LTE, WiMAX, iDEN, TDMA, AMPS, GSM, GPRS, UMTS, EDGE, MMDS, WI-FI, and BLUETOOTH. Each protocol may define its own procedures for initiation of calls, handoff between coverage areas, and functions related to air interface communication.

Further, air interface communications in each coverage area of a cellular wireless system may be encoded or carried in a manner that distinguishes the communications in that coverage area from communications in adjacent coverage areas. For example, in a CDMA system, each coverage area has a respective pseudo-random noise offset or "PN offset" that is used to encode or modulate air interface communications in the coverage area distinctly from those in adjacent coverage areas. And in an LTE system, each coverage area has a respective identifier ("cell ID" or "sector ID") that is broadcast in a synchronization signal to distinguish the coverage area from adjacent coverage areas. Analogously, in other air interface protocols, communications in one sector may be distinguished from those in other sectors by frequency, time, and/or various other parameters.

To enable a UE to select an appropriate coverage area in which to operate, the base stations in a cellular wireless system may be arranged to broadcast in each of their coverage areas a respective pilot signal (or "reference signal"). In practice, a UE may then scan for and evaluate the strength of any detected the pilot signals, and the UE may then seek to operate in the coverage area providing the strongest pilot signal.

When a UE first powers on, the UE may go through this scanning process to select an initial coverage area in which to operate. Further, when the UE is operating in a particular coverage area, the UE may continue to monitor the pilot signal of that coverage area as well as the pilot signals of other coverage areas, to help ensure that the UE continues to operate in the coverage area providing the best coverage. In particular, if the UE detects that the pilot strength in its current coverage area is sufficiently weak and the pilot strength in another coverage area is sufficiently strong, the UE may then hand off from operating in its current coverage area to operating in the other coverage area.

Moreover, in some cases, more than one air interface protocol might be implemented in a given market area. For example, a given market area might include both a CDMA network and a LTE network. In such an area, a UE might not only hand off between coverage areas under a common air interface protocol but might also hand off between coverage areas of different air interface protocols, such as between CDMA coverage and LTE coverage for instance.

Overview

When a UE is served by a particular network (a source network) and hands off from that network to another network (a target network), particularly where the target network operates on a different air interface protocol than the source network, the UE may need to determine certain operational parameters of the target network so that the UE can set itself to operate properly in that network. By way of example, when a UE is handing off from an LTE network to a CDMA network, the UE may need to determine CDMA network parameters such system time (to help the UE synchronize its communication with the target network), neighbor list data (to enable the UE to scan for handoff within the target network), access channel parameters (to enable the UE to send control channel messages to the target network), and the like, which the UE may then reference and use while being served by the CDMA network. Other examples are possible as well, depending on the type and configuration of the target network.

To facilitate this, a network may periodically broadcast in each of its coverage areas one or more overhead signals that specify the network's relevant operational parameters. For example, a CDMA network may periodically broadcast on one or more downlink control channels in each of its coverage areas a "system parameters message" and an "access parameters message" that may provide information such as that described above. When a UE is handing off to such a network, the UE may thus tune to the downlink control channels of the network, wait for the next periodic broadcast of the overhead signals, and then read the signals to acquire the relevant operational parameters of the network.

If a UE is handing off from a source network to a target network while the UE is engaged in an active communication (such as a voice call or a data session), however, this process of waiting to read the overhead control signaling broadcast by the target network can undesirably delay the handoff process and thereby disrupt the UE's ongoing communication.

One way to help avoid or minimize this delay in the handoff process and otherwise to facilitate having a UE operate properly in a target network is to have the source network provide the UE with the operational parameters of the target network. In particular, in a scenario where a first network operates in a given market area and a second network operates in the same market area (perhaps where the first and second network are owned and/or operated by the same service provider), the first network may generally broadcast to its UEs the operational parameters of the second network so that the UEs can store that information for later reference. When a UE then hands off from the first network to the second network, the UE may conveniently refer to those previously stored operational parameters and make use of the parameters while being served by the second network.

As a specific example of this, an LTE network may provide operational parameters for a CDMA network in the same market area, by broadcasting in each LTE coverage area a system information block (SIB) called "SIB8" (System Information Block #8) that carries the operational parameters of the CDMA network. In general, when a UE first acquires connectivity with the LTE network, the UE may read that SIB8 information (as well as other system information blocks) and store the information for later reference. Thereafter, while the UE is operating in the LTE network, if the UE detects threshold low LTE signal strength, the UE may then scan for CDMA coverage and report the detected CDMA coverage to the LTE network, and the LTE network may direct the UE to hand off to the detected CDMA network. At that point, the UE may then conveniently connect with the CDMA network and make use of the CDMA operational parameters that the UE had earlier received in the SIB8 from the LTE network.

A problem with this scenario, however, may arise where more than one other network provides coverage in the same market area as the serving network, and where the other networks each have their own distinct set of operational parameters. With LTE and CDMA for instance, the problem could arise if multiple disparate CDMA networks exist in the same market area as the serving LTE network. LTE assumes that a single CDMA network (if any) exists in the LTE market area, and therefore an LTE defines just a single SIB8 that specifies operational parameters of that CDMA network. This arrangement may be suitable for a scenario where a given wireless carrier operates both an LTE network and a CDMA network throughout a given market area, to enable the carriers' subscribers to readily use the carrier's LTE service or CDMA service depending on availability. However, there could be a scenario where an LTE provider not only operates its own CDMA network within the LTE market area but also partners with another CDMA provider who operates another CDMA network within the LTE market area. In that scenario, a single SIB8 provided by the LTE network would not suffice.

Disclosed herein is a method and corresponding system to help overcome this issue. In accordance with the method disclosed, a first wireless network may maintain data that includes operational parameters of each of a plurality of second wireless networks, such as networks that provide coverage in the same market area as the first wireless network, and when the first network receives from a UE an indication that the UE has detected coverage of a particular one of the second networks, the first network may then provide the UE with the corresponding set of operational parameters for the detected second network.

More particularly, an example method may involve a first network maintaining data that includes, separately for each of a plurality of second wireless networks, a set of operational parameters corresponding respectively with the second wireless network. Further, the method may include the first wireless network serving a user equipment device (UE) and receiving from the UE a report of one of the second wireless networks detected by the UE, the report specifying an identifier of the detected second wireless network. The method may then involve the first network, in response to at least receipt of the report, (i) referring to the data to select, based on the identifier specified in the report, the a set of operational parameters corresponding with the detected second wireless network and (ii) transmitting to the UE the selected set of operational parameters, to assist the UE in handing off from the first wireless network to the detected second wireless network.

Further, an example system may function to manage handoff from a first radio access network (RAN), wherein the first RAN includes an antenna structure configured to radiate so as to define first wireless coverage in which the first RAN serves UEs according to a first air interface protocol. The system may include data storage that holds data including, respectively for each of a plurality of second RANs, a set of operational parameters specific to operation of the second RAN, wherein each second RAN provides second wireless coverage in which the second RAN serves UEs according to a second air interface protocol. Further, the system may include a controller configured to receive, via the antenna structure, from a UE served by the first RAN, a report that the UE detected coverage of at least a particular one of the second RANs, the report specifying an identifier of the particular second RAN whose coverage the UE detected. And the controller may be configured to respond to the received report at least in part by (i) selecting from the data, based on the identifier specified by the report, the set of operational parameters specific to operation of the particular second RAN and (ii) transmitting, to the UE the selected set of operational parameters, via the antenna structure, to assist the UE in handing off from the first RAN to the particular second RAN.

These as well as other aspects, advantages, and alternatives will become apparent to those of ordinary skill in the art by reading the following detailed description, with reference where appropriate to the accompanying drawings.

DETAILED DESCRIPTION

Figure 1:
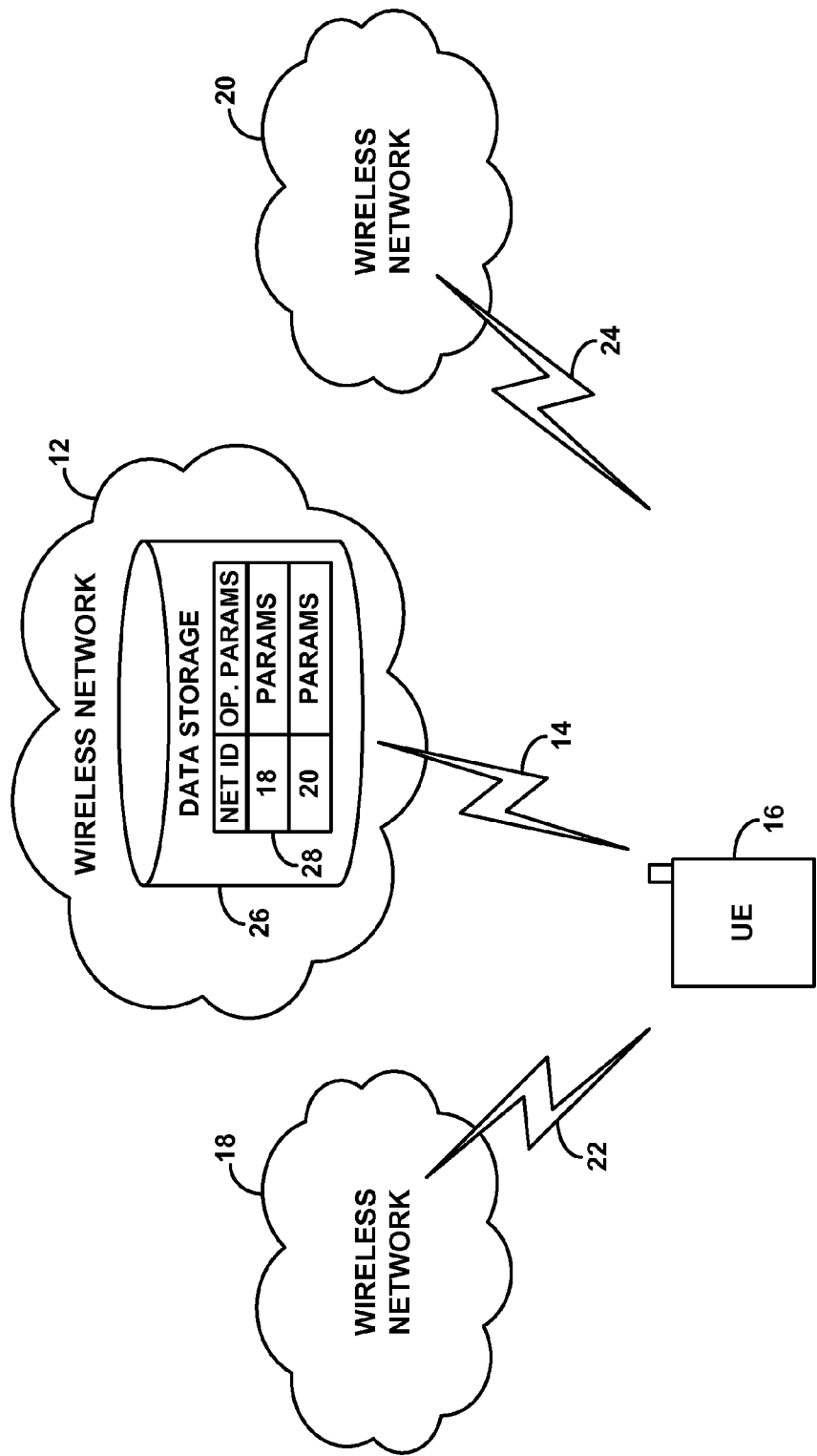
FIG. 1 is a simplified block diagram depicting a network arrangement in which the present method can be implemented.

Referring to the drawings, as noted above, FIG. 1 is a simplified block diagram depicting a network arrangement in which the present method can be implemented. As shown in FIG. 1, the network arrangement includes a representative first network 12 that radiates to define at least one coverage area 14 in which the first network serves a representative UE 16. Further, the arrangement includes two representative second networks 18, 20, each of which radiates to define at least one respective coverage area 22, 24, which may overlap with coverage area 14. Coverage area 22 provided by second network 18 is shown at one side of coverage area 14 provided by network 12, and coverage area 24 provided by network 20 is shown at another side of coverage area 14 provided by network 12.

In practice, each of the illustrated networks would include one or more base stations, including antenna structures, power amplifiers, and associated equipment, configured to radiate so as to define at least the illustrated coverage areas. These base stations may include macro base stations of the type commonly situated on antenna towers in public areas and radiating to provide broad coverage. Further, the base stations may include pico or femto base stations, which typically have smaller footprints and radiate to provides more restricted coverage, such as for in-building use for instance.

In line with the discussion above, first network 12 in this arrangement may operate with a different air interface protocol than second networks 18, 20. Further, second networks 18, 20 may operate with the same air interface protocol as each other. By way of example, first network 12 may be an LTE network, providing UE with LTE service, and each of the second networks 18, 20 may be CDMA networks providing CDMA service. Further, one of these CDMA networks 18, 20 may be owned and/or operated by the same carrier that provides the LTE network 12, and the other CDMA network may be owned and/or operated by a partner carrier.

Although FIG. 1 shows the three networks 12, 18, 20 as being separate clouds, it should be understood that portions of the networks could be shared. For example, if a given carrier provides an LTE network as network 12 and a CDMA network as network 18, the carrier may operate numerous multi-mode base stations or antenna towers, functioning both to provide LTE coverage for the carrier's LTE network and CDMA coverage for the carrier's CDMA network. Other arrangements are possible as well.

Each of the networks shown in FIG. 1 may have a corresponding identifier, which the network may broadcast on a downlink channel so that UEs entering into the network's coverage can determine the network's identifier. By way of example, such an identifier may comprise a public land mobile network (PLMN) identifier, or a system identification/network identification (SID/NID). Each CDMA network, for instance, may have a SID/NID corresponding with the CDMA network's carrier, and each base station in the CDMA network may broadcast an indication of the SID/NID on a downlink sync channel. When a UE enters into coverage a such a CDMA network, the UE may read SID/NID from the downlink sync channel to thereby determine the identity of the CDMA network.

Alternatively, in a scenario where various networks operate on different frequency bands or frequency channels, a network's identifier may take the form of the frequency band or channel on which the network operates. Thus, if a UE detects coverage of a CDMA network on a particular frequency band or channel, that band or channel may serve to identify the CDMA network and to distinguish it from other CDMA networks that may operate on other frequency bands or other frequency channels. Other types of network identifiers may exist as well.

As shown in FIG. 1, first network 12 includes data storage 26, which holds data 28 that includes a set of operational parameters respectively for each of the second networks 18, 22. (In practice, the first network may maintain this data itself or may maintain the data by having another entity store the data in a manner accessible to the first network.) As shown, the data 28 correlates each second network's set of operational parameters with an identifier of the second network. Each set of operational parameters may define general operational rules, policies, thresholds, and the like for its corresponding network. For instance, in line with the discussion above, for a CDMA network, the set of operational parameters may include information such as what the CDMA network itself also broadcasts in a system parameters message, access parameters message or the like. And as a particular example, the operational parameters may include various parameters that would normally be listed in a SIB8 for the CDMA network, including but not limited to the operational parameters discussed above.

With this arrangement, when UE 16 is being served by first network 12, the UE may for one reason or another scan for coverage of various second networks, including for instance, networks 18, 20. By way of example, if the UE detects threshold low signals strength from its serving first network 12, the UE may then begin to scan for possible handoff to one of the second networks. The UE may be provisioned in advance with data indicating frequency bands on which the various second networks operate, or the UE may report its threshold low first network signal strength to the first network, and the first network may responsively direct the UE to scan various frequency bands in search of other coverage.

Upon performing this scanning, the UE may detect sufficiently strong second network coverage to justify a handoff from the first network to a second network. Such coverage may be "sufficiently strong" by being at least as strong as a threshold level and/or by being at least a threshold extent stronger than signal strength that the UE is receiving from its serving first network 12. The UE may be provisioned with these or other thresholds in various ways, such as by receiving the thresholds from the serving first network 12 as operational parameters of the first network 12 for instance.

Because the UE 16 could be operating substantially anywhere in the coverage 14 of first network 12, there is a chance that the UE may detect sufficiently strong coverage from either of the two second networks 18, 20 shown. Moreover, depending on the configuration of the networks and particularly the extent and location at which coverage of the second networks overlaps with coverage of the first network, the UE might even detect sufficiently strong coverage from both second networks 18, 20.

In practice, when the UE detects sufficiently strong coverage from a given second network, the UE may also determine the identity of that detected second network. For instance, if the detected second network is a CDMA network that broadcasts its SID/NID on a downlink sync channel, the UE may tune to that downlink sync channel of the detected network and read the SID/NID. Alternatively, if the second network can be identified by the frequency channel on which it operates, the UE may determine the identifier of the detected second network by deeming the frequency channel on which the UE detected the second network to be the identifier of the second network. Other examples are possible as well.

Upon detecting at least one sufficiently strong second network, the UE may then report to the first network 12 the fact that the UE detected the detected second network. By way of example, the UE may transmit on an uplink channel to the first network a radio measurement report or the like in which the UE specifies the measured signal strength and the determined identifier of the detected second network. If the UE detected multiple such second networks, the UE may include in such a radio measurement report an indication of signal strength and identifier for each detected second network. The first network 12 may thus receive from the UE a report that the UE detected at least one second network, specifying the identifier of each such detected second network.

Upon receipt of such a report from the UE, in accordance with the present method, the first network 12 may then refer to data 28 in order to select an appropriate set of operational parameters to provide to the UE. In the event the UE reported just a single detected second network, the first network may simply refer to the data 28 to map the network identifier provided in the UE's report to the set of operational parameters that the data correlates with that network identifier. On the other hand, if the UE reported more than one detected second network, the first network may apply one or more policies to determine which of the reported second networks should be the UE's handoff target. For example, the first network could select one of the reported second networks on grounds that that network is owned and/or operated by the same carrier that owns and/or operates the first network. As another example, the first network could select one of the reported second networks on grounds that the UE being served by that particular second network may be less costly to the first network (in terms of roaming costs for instance). In any event, once the first network then selects one of the reported second networks, the first network may then refer to the data 28 to map the UE-provided identifier of that second network to the set of operational parameters that the data correlates with that network identifier.

Once the first network selects the appropriate set of operational parameters, the first network may then transmit that set of operational parameters to the UE to enable the UE to more readily begin operation in the detected second network. For instance, if the first network is an LTE network, the first network could transmit the set of operational parameters to the UE in a Radio Resource Control (RRC) connection reconfiguration message. Such a message may provide the UE with both the set of operational parameters for the detected second network as well as one or more other pieces of information beyond the operational parameters of the detected second network. An example of such other information is a traffic channel assignment specifying a traffic channel that the UE is to use in the detected second network. Other examples may be possible as well.

Once the UE receives the selected set of operational parameters for the detected second network, and possibly after the UE engages in additional signaling with the first network and/or with the detected second network, the UE may then hand off from the first network to the detected second network. As part of this handoff process and/or once the UE is then served by the detected second network, the UE may then make good use of the received set of operational parameters for the detected second network. For example, if the UE received timing information for the detected second network, the UE could use that information to help synchronize its communications with the second network. As another example, if the UE received neighbor list data for the detected second network, the UE could use that information to scan for handoff among coverage areas within the detected second network. And as another example, if the UE received access channel parameters for the detected second network, the UE could use those parameters to govern the manner in which the UE sends access probes on an access channel to the detected second network. Other examples are possible as well.

Advantageously, this process may thus help to streamline the UE's process of handing off from the first network to the detected second network, as the process may allow the UE to forgo reading some or all such operational parameters broadcast by the detected second network. In a scenario where the UE is engaged in an active communication during the handoff, this can be especially beneficial, by helping to reduce the delay and interruption to the communication.

Figure 2:
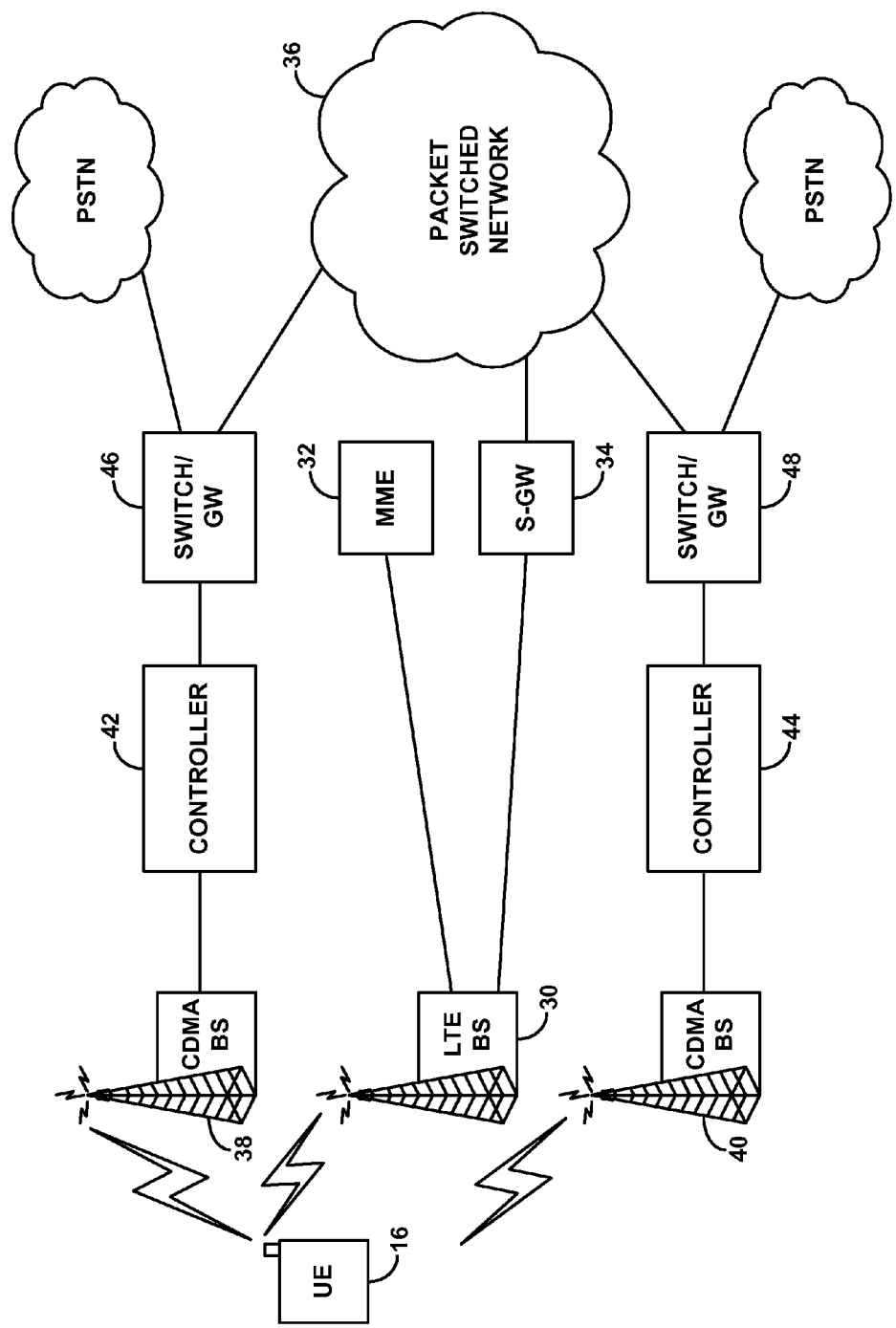
FIG. 2 is a more specific, but still simplified, block diagram depicting a network arrangement including both an LTE network and multiple CDMA networks, in which the present method can be implemented.

FIG. 2 is next a more specific block diagram of an example network arrangement, depicting a scenario where the first network 12 is an LTE network, and each of the second networks 18, 20 is a CDMA network. Each of these networks may be considered radio access networks or wireless networks, as they function to provide UEs with network access through wireless radio communication.

In this still simplified diagram, the LTE network 12 is shown including at least one base station 30 known as an "eNodeB", which radiates to define coverage 14. The eNodeB 30 is then coupled with a controller 32 known as mobility management entity (MME) and with a gateway 34 known as a serving gateway (S-GW) that, together with one or more other gateways, provides connectivity with a packet-switched network 36 such as the Internet for instance.

Each CDMA network 18, 20 is then shown including at least one respective base station 38, 40, known as a "base transceiver station" (BTS) or access node (AN), which radiates to define the respective coverage 22, 24. The base station is then coupled with a controller 42, 44 such as a base station controller (BSC) or radio network controller (RNC), which may in turn couple with one or more switches and/or gateways 46, 48, such as mobile switching center (MSC) and packet data serving node (PDSN), that provide connectivity with one or more transport networks 50, 52 such as the PSTN or the Internet for instance.

With this arrangement, functions of the present method may be carried out by one or more entities of the LTE network 12. For example, the functions could be carried out by the eNodeB 30. In practice, for instance, the eNodeB may maintain a set of operational parameters, respectively, for each of the CDMA networks 18, 20. When a UE is being served by the eNodeB and detects threshold low eNodeB signal strength and is unable to find any other sufficiently strong LTE coverage from network 12, the UE may then scan for CDMA coverage and detect one of CDMA networks 18, 20. The UE may then send a radio measurement report to the eNodeB, providing the eNodeB with an identifier of the detected CDMA network. And the eNodeB may then refer to its data 28 to map that identifier to the appropriate set of operational parameters and may send the set of operational parameters to the UE in an RRC connection reconfiguration message.

Figure 3:
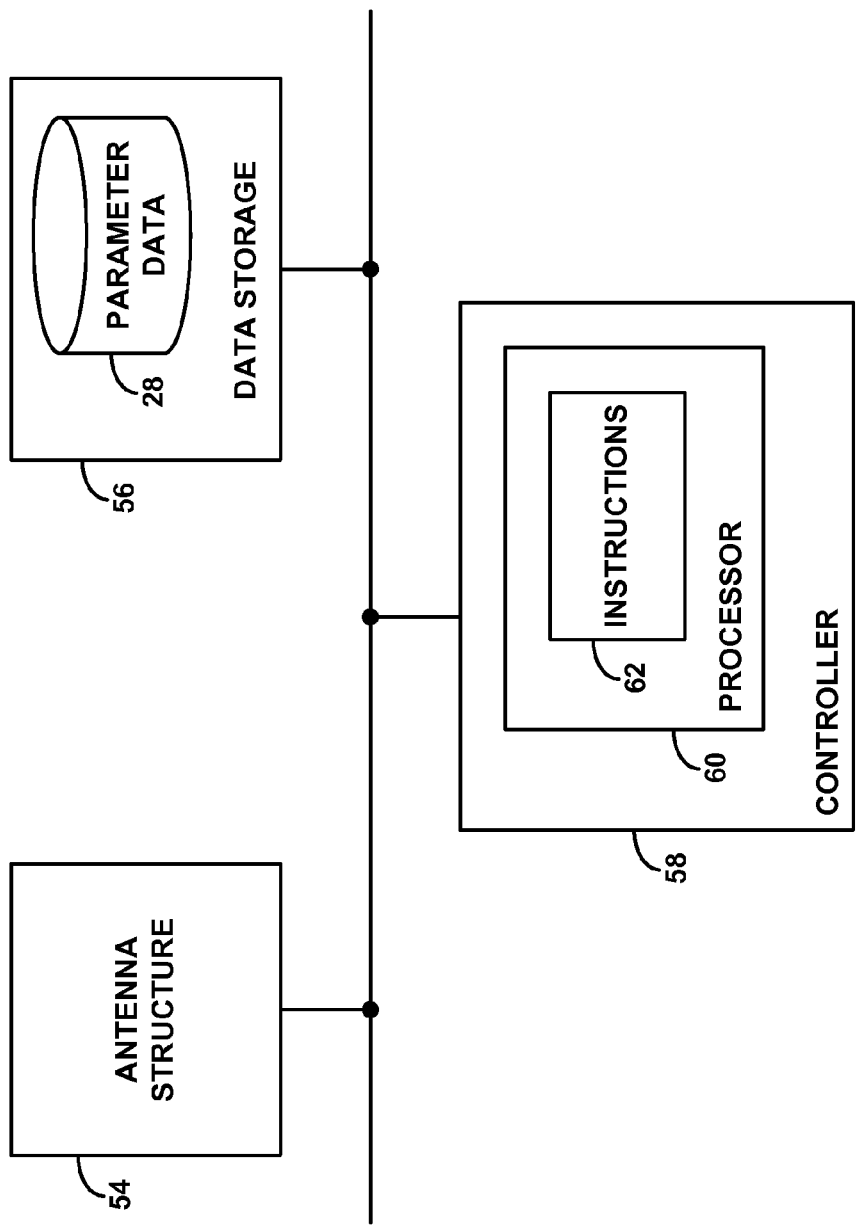
FIG. 3 is a simplified block diagram showing functional components of a system arranged to implement the method.

FIG. 3 is next a simplified block diagram depicting functional components that could be included in one or more entities of a system, such as in eNodeB 30, to facilitate carrying out various functions described herein. These components may be communicatively linked together by a system bus, network, or other connection mechanism as shown generally in the figure. As shown, the functional components include an antenna structure 54 that is configured to radiate to as to define first wireless coverage in which the first network may serve UEs according to a first air interface protocol, such as but not limited to LTE for instance. Further, the functional components include data storage 56 that holds parameter data 28 including, respectively for each of a plurality of second networks, a set of operational parameters specific to operation of the second network. Each such second network may provide second wireless coverage in which the second network may serve UEs according to a second air interface protocol, such as but not limited to CDMA for instance.

As further shown, the functional components then additionally include a controller 58, which may comprise a processor 60 (e.g., general purpose microprocessor and/or special purpose processor) programmed with machine language instructions 62 to carry out various described functions and/or specialized circuitry or other structure arranged to carry out various described functions.

Such a controller 58 may, for instance, receive, via the antenna structure 54, from a UE served by the first network 12, a report that the UE detected coverage of at least a particular one of the second networks, the report specifying an identifier of the particular second network whose coverage the UE detected. The controller may then respond to the received report at least in part by (i) selecting from the data held by data storage 56, based on the identifier specified by the report, the set of operational parameters specific to operation of the particular second RAN and (ii) transmitting, to the UE the selected set of operational parameters, via the antenna structure.

As discussed above, this process may assist the UE in handing off from the first network to the particular second network. For instance, the set of operational parameters that the second network selects may comprise one or more particular parameters that the particular second network also broadcasts in the second wireless coverage and that the UE would otherwise read from the particular second network when handing off from the first network to the particular second network. As the controller transmits the selected set of operational parameters to the UE, the UE may thus forgo reading the one or more particular parameters from the particular second network when handing off from the first network to the particular second network.

Figure 4:
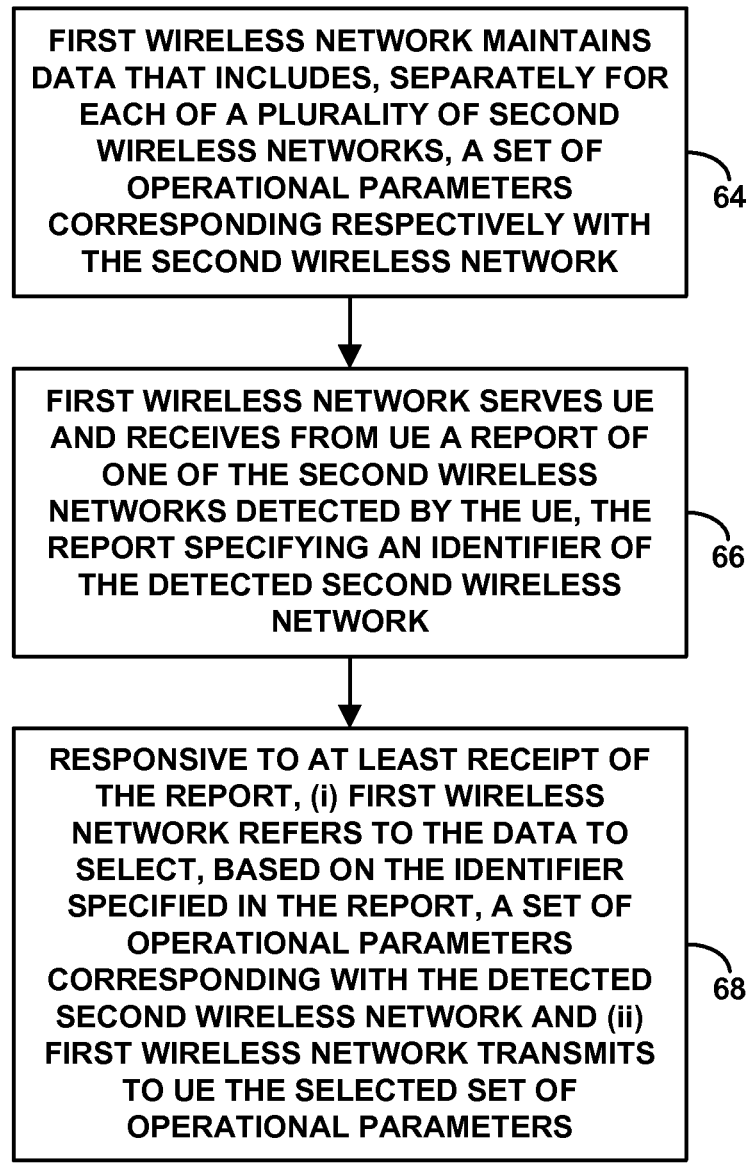
FIG. 4 is a flow chart depicting functions that can be carried out in accordance with the method.

Finally, FIG. 4 is next a flow chart depicting functions that can be carried out in accordance with the present method. As discussed above, these functions may be carried out by an entity of the first network 12, such as by a base station and/or one or more other entities.

As shown in FIG. 1, at block 64, the method may involve a first wireless network maintaining data that includes, separately for each of a plurality of second wireless networks, a set of operational parameters corresponding respectively with the second wireless network. Further at block 66 (concurrently with step 64), the method may involve the first wireless network serving a UE and receiving from the UE a report of one (i.e., at least one) of the second wireless networks detected by the UE, the report specifying an identifier of the detected second wireless network. And at block 68, the method may involve, responsive to at least receipt of the report, (i) the first wireless network referring to the data to select, based on the identifier specified in the report, a set of operational parameters corresponding with the detected second wireless network and (ii) the first wireless network transmitting to the UE the selected set of operational parameters, to assist the UE in handing off from the first wireless network to the detected second wireless network.

Here again, the selected set of operational parameters may comprise one or more particular parameters that the detected second wireless network also broadcasts and that the UE would otherwise read from the detected second wireless network when handing off from the first wireless network to the detected second wireless network. Thus, the act of the first wireless network transmitting the selected set of operational parameters to the UE may enable the UE to forgo reading the one or more particular parameters from the detected second wireless network when handing off from the first wireless network to the detected second wireless network, thus possibly expediting the handoff process and reducing interruption to any ongoing communication.

In line with the example scenario discussed above, in this process, the first wireless network may operate in accordance with a first air interface protocol, and each of the second wireless networks may operate in accordance with a second air interface protocol different than the first air interface protocol. For instance, the first air interface protocol may be LTE, and the second air interface protocol may be CDMA.

Moreover, the method may involve the first wireless network directing the UE to scan for second wireless network coverage, such as by configuring the UE to monitor signal strength from the first wireless network and, upon detecting that the signal strength from the first wireless network falls to a threshold low level, to scan for second wireless network coverage. In practice, for instance, the first wireless network may broadcast (e.g., in a SIB) the threshold value for the UE to use in this process. Further, the first wireless network may provide the UE (e.g., in a SIB) with a list of one or more frequency channels on which the UE is to scan for second wireless network coverage. The UE may be programmed to receive these parameters from the first wireless network and to responsively scan for second wireless network in accordance with the parameters. In this case, the act of the first wireless network receiving the report from the UE may occur in response to the first wireless network directing the UE to scan for the second wireless network coverage, in that the directing may trigger the reporting.

Exemplary embodiments have been described above. Those of ordinary skill in the art will appreciate, however, that numerous changes can be made to these embodiments while remaining within the scope and spirit of the invention. By way of example, although the discussion above is focused on handoff from LTE to CDMA, the description could extend to apply with respect to any of a variety of other air interface protocols or combinations of air interface protocols, such as for handoff from LTE to GSM, handoff from CDMA to WiFi, and in other arrangements now known or later developed.

What is claimed is:

1. A method comprising:
    a first wireless network maintaining data that includes, separately for each of a plurality of second wireless networks, a set of operational parameters corresponding respectively with the second wireless network;
    the first wireless network serving a user equipment device (UE) and receiving from the UE a report that the UE detected coverage of at least one of the second wireless networks, the report specifying an identifier of the detected second wireless network; and
    responsive to at least receipt of the report that the UE detected coverage of at least one of the second wireless networks, (i) the first wireless network referring to the data to select, based on the identifier specified in the report, the set of operational parameters corresponding with the detected second wireless network and (ii) the first wireless network transmitting to the UE the selected set of operational parameters, to assist the UE in handing off from the first wireless network to the detected second wireless network.

2. The method of claim 1, wherein the selected set of operational parameters comprises one or more particular parameters that the detected second wireless network also broadcasts and that the UE would otherwise read from the detected second wireless network when handing off from the first wireless network to the detected second wireless network,
    whereby the first wireless network transmitting the selected set of operational parameters to the UE enables the UE to forgo reading the one or more particular parameters from the detected second wireless network when handing off from the first wireless network to the detected second wireless network.

3. The method of claim 1, carried out by a base transceiver station of the first wireless network.

4. The method of claim 1, wherein the first wireless network operates in accordance with a first air interface protocol, and each of the second wireless networks operates in accordance with a second air interface protocol different than the first air interface protocol.

5. The method of claim 1, wherein the first air interface protocol is Long Term Evolution (LTE), and the second air interface protocol is Code Division Multiple Access (CDMA).

6. The method of claim 5, wherein the selected set of operational parameters comprises one or more parameters selected from the group consisting of CDMA system time, a CDMA neighbor list, and CDMA access channel parameters.

7. The method of claim 5, wherein the selected set of operational parameters comprises LTE System Information Block #8 (SIB8) parameters.

8. The method of claim 1, wherein the first wireless network operates in accordance with a Long Term Evolution (LTE) air interface protocol, and wherein the first wireless network transmits to the UE the selected set of operational parameters in a Radio Resource Control (RRC) Connection Reconfiguration message.

9. The method of claim 1, further comprising:
the first wireless network directing the UE to scan for second wireless network coverage, wherein the first network receiving the report from the UE occurs in response to the directing the UE to scan for the second wireless network coverage.

10. The method of claim 1, wherein directing the UE to scan for second wireless network coverage comprises:
configuring the UE to monitor signal strength from the first wireless network and, upon detecting that the signal strength from the first wireless network falls to a threshold low level, to scan for second wireless network coverage.

11. The method of claim 10, wherein directing the UE to scan for second wireless network coverage further comprises:
providing the UE with a list of one or more frequency channels on which to scan for second wireless network coverage.

12. The method of claim 1, wherein the identifier of the detected second wireless network comprises a system identifier (SID) and network identifier (NID).

13. A system for managing handoff from a first radio access network (RAN), wherein the first RAN includes an antenna structure configured to radiate so as to define first wireless coverage in which the first RAN serves UEs according to a first air interface protocol, the system comprising:
data storage holding data that includes, respectively for each of a plurality of second RANs, a set of operational parameters specific to operation of the second RAN, wherein each second RAN provides second wireless coverage in which the second RAN serves UEs according to a second air interface protocol; and
a controller configured to receive, via the antenna structure, from a UE served by the first RAN, a report that the UE detected coverage of at least a particular one of the second RANs, the report specifying an identifier of the particular second RAN whose coverage the UE detected,
wherein the controller is further configured to respond to the received report that the UE detected coverage of at least the particular second RAN at least in part by (i) selecting from the data, based on the identifier specified by the report, the set of operational parameters specific to operation of the particular second RAN and (ii) transmitting, to the UE the selected set of operational parameters, via the antenna structure, to assist the UE in handing off from the first RAN to the particular second RAN.

14. The system of claim 13, wherein the selected set of operational parameters comprises one or more particular parameters that the particular second RAN also broadcasts in the second wireless coverage and that the UE would otherwise read from the particular second RAN when handing off from the first RAN to the particular second RAN,
whereby the controller transmitting the selected set of operational parameters to the UE enables the UE to forgo reading the one or more particular parameters from the particular second RAN when handing off from the first RAN to the particular second RAN.

15. The system of claim 13, wherein the first air interface protocol comprises Long Term Evolution (LTE), and wherein the second air interface protocol comprises Code Division Multiple Access (CDMA).

16. The system of claim 15, wherein the selected set of operational parameters comprises one or more parameters selected from the group consisting of CDMA system time, a CDMA neighbor list, and CDMA access channel parameters.

17. The system of claim 16, wherein the selected set of operational parameters comprises LTE System Information Block #8 (SIB8) parameters.

18. The system of claim 13, wherein the first RAN includes a base station, and wherein the base station includes the antenna structure, the data storage, and the controller.

19. The system of claim 13, wherein the first RAN operates in accordance with a Long Term Evolution (LTE) air interface protocol, and wherein the selected set of operational parameters is transmitted to the UE in a Radio Resource Control (RRC) Connection Reconfiguration message.

20. The system of claim 13, wherein the identifier of the detected second RAN comprises a system identifier (SID) and network identifier (NID).

* * * * *